June 20, 1939. E. C. SULLIVAN 2,162,983
GLASS MELTING FURNACE AND METHOD OF USING THE SAME
Filed June 2, 1937
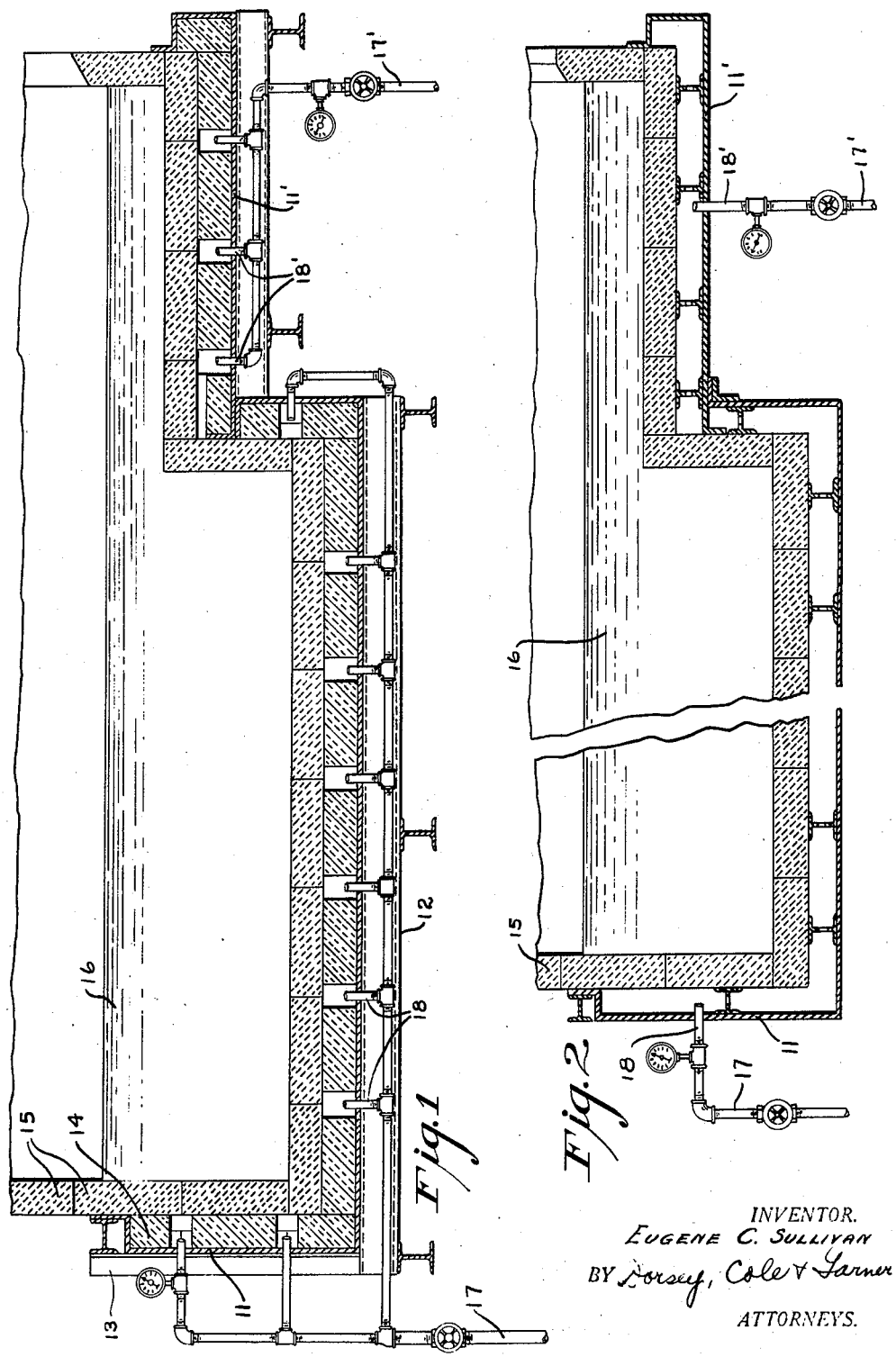
INVENTOR.
EUGENE C. SULLIVAN
BY Dorsey, Cole & Garner
ATTORNEYS.

Patented June 20, 1939

2,162,983

UNITED STATES PATENT OFFICE 2,162,983

GLASS MELTING FURNACE AND METHOD OF USING THE SAME

Eugene C. Sullivan, Corning, N. Y., assignor to Corning Glass Works, Corning, N. Y., a corporation of New York Application June 2, 1937, Serial No. 146,090

9 Claims. (Cl. 49—54)

The present invention relates to glass melting furnaces and particularly to improvements in the melting tanks of such furnaces.

It has long been recognized that the tanks of glass melting furnaces have extremely low heat efficiency and it has accordingly been proposed to insulate the walls thereof. Difficulties have been encountered, however, even with the use of extremely high grade refractory blocks, as molten glass penetrates between and around the blocks when such insulation is applied to them, thus exposing several faces of each block to the corrosive action of the molten glass and thereby reducing the effective life of the blocks. It has more recently been proposed to overcome these difficulties by applying insulation to the outside surfaces of the blocks composing the bottom and side walls of the tank, the insulation, however, being interrupted along the seams between the blocks and the exposed seams being artificially cooled, if desired, by means of air blasts or otherwise, so as to insure solidification of the glass penetrating between the blocks.

The principal object of the present invention is to minimize the heat loss through the side and bottom walls of melting tanks of such furnaces while preventing the melted glass from entering the seams or joints between the respective blocks.

Another object is to accelerate the fining and homogenizing of glass in melting tanks.

The foregoing objects may be accomplished by employing my invention, which embodies among its features the application of air to the seams in the bottom wall of the tank at a pressure at least great enough to prevent the glass entering such seams; and by applying the same pressure to the seams occurring in the side walls of the melting portion of the tank.

In the drawing:

Fig. 1 is a side elevation in section of a melting tank constructed in accordance with the invention; and Fig. 2 is a similar view of a modified form of the invention.

In the form of the invention illustrated in Fig. 1, two metal jackets 11 and 11', preferably having highly reflective inner surfaces, rest on girders 12 of a suitable steel frame-work 13. These jackets are lined with blocks 14 of a suitable insulating material and these blocks are in turn lined with refractory blocks 15 forming the melting tank proper. The arrangement of the blocks 15 is such that they join one another at the midsections of spaces left between the blocks 14, thereby forming net-works of air channels from which the escape of air to any appreciable extent is only possible through the joints or seams of the tank proper into glass 16 contained therein. Air is supplied to the network of channels adjacent the bottom and side-walls of the melting end of the tank by an air supply line 17 having as many branches 18 passing through the wall of jacket 11 as needed to maintain a desired pressure over the area served; while air is supplied to the channels adjacent the bottom only of the working end of the tank by air supply line 17' having as many branches 18' passing through the wall of jacket 11' as needed to maintain a desired pressure on the joints in this area.

In the operation of a melting furnace equipped with the foregoing form of melting tank, at least sufficient pressure is maintained in the channels arranged about the melting end of the tank to provide static air pressure at the seams in the bottom thereof so as to prevent glass flowing into the seams. Since the glass pressure against the sidewalls of the tank becomes gradually less as the top level of the glass is approached, air will flow through the sidewall joints at a velocity depending on their height. This movement of air is sufficient to cause bubbling through the glass and provides a very effective means of accelerating the homogenizing and fining of the melt. Further acceleration of the homogenizing and fining of the melt can also be obtained by increasing the pressure sufficiently to cause air to also flow through the joints in the tank bottom. If desired, gases which are lighter and more diffusible than air may be used for bubbling, thereby further accelerating the fining action.

Bubbling should not occur in the working end of the tank; and since it would be impossible to maintain static air pressure along the vertical joints in the sidewalls, only those joints or seams occurring in the bottom of this end of the tank are enclosed and subjected to air under pressure to prevent glass entering the seams and which must be maintained at static pressure to prevent bubbling.

In the form of the invention illustrated by Fig. 2, the tank structure has been somewhat simplified by omission of the insulating blocks 14, enabling the maintenance of a uniform pressure to the exterior surfaces of the blocks served by the respective air lines 17 and 17' without the need of a plurality of branch lines 18 and 18'.

While only one shape of melting tank is illustrated, with the exterior surfaces thereof divided into but two main pressure areas, it should be understood that the invention is not to be limited to these particular details, as the same principles can be embodied in any shape of melting tank and the external surfaces thereof divided into as many pressure areas as are considered necessary to obtain the control desired.

What is claimed is:

1. The method of assisting in the fining and homogenizing of glass in a melting tank, which includes forcing a fluid medium through seams in the tank wall as required to cause bubbling of the glass.

2. The method of assisting in the fining and homogenizing of glass and in the prevention of its leakage through joints or seams in a melting tank wall, which includes forcing a gaseous medium through such joints or seams and through the melted glass.

3. The method of assisting in the fining and homogenizing of glass and in the prevention of its leakage through joints or seams in the floor and walls of the tank of a melting furnace, which includes forcing a gaseous medium through the joints or seams in the tank wall in the one section thereof and the maintenance of static pressure across those joints or seams in the floor of another section thereof.

4. In a glass melting furnace, an assembly of refractory blocks arranged to form a melting tank, and enclosures of reflective insulating material arranged about the bottom and sidewalls of said tank in which selected super-atmospheric air pressures can be readily maintained.

5. In a glass melting furnace, a melting tank composed of refractory blocks, blocks of insulating material covering the major portions of the outer surfaces of said blocks, and an enclosure in which air pressure can be maintained formed in part by said blocks of insulating material.

6. In a glass melting furnace, a melting tank composed of refractory blocks, blocks of insulating material covering the major portions of the outer surfaces of said blocks, and separate enclosures, for selected groups of said blocks of insulating material, in which selected air pressures can be maintained.

7. In a tank for molten glass an inner wall of refractory blocks, an insulating unit covering the major portion of the exterior surface of each block; and means bridging the spaces between adjacent insulating units to form chambers in which super-atmospheric air pressure can be maintained.

8. In a glass melting tank, an inner wall of refractory tank blocks, an outer wall of insulating material arranged to leave the seams between the adjacent refractory blocks exposed; and an enclosure, surrounding predetermined areas of the tank in which air pressure can be maintained.

9. A glass melting tank comprising a plurality of blocks set side by side, insulating material extending over the major portion of the exterior surface of each block and extending nearly to the seams between the blocks to leave recesses overlying the seams, means bridging certain of said recesses to prevent the escape of fluid therefrom and means to maintain fluid pressure within the recesses to prevent the passage of molten glass through the seams.

EUGENE C. SULLIVAN.